US011416759B2

(12) United States Patent
Lang et al.

(10) Patent No.: US 11,416,759 B2
(45) Date of Patent: Aug. 16, 2022

(54) EVENT-BASED SENSOR THAT FILTERS FOR FLICKER

(71) Applicant: SAMSUNG ELECTRONICS CO., LTD., Suwon-si (KR)

(72) Inventors: Itai Lang, Kibbutz Gan Shmuel (IL); Nathan Henri Levy, Givatayim (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1120 days.

(21) Appl. No.: 15/988,005

(22) Filed: May 24, 2018

(65) Prior Publication Data
US 2019/0362256 A1 Nov. 28, 2019

(51) Int. Cl.
H04N 5/345 (2011.01)
G06N 7/00 (2006.01)
G08B 5/38 (2006.01)
G01J 1/42 (2006.01)
H04N 5/335 (2011.01)
H04N 5/357 (2011.01)
H04N 5/235 (2006.01)

(52) U.S. Cl.
CPC ............. G06N 7/005 (2013.01); G01J 1/42 (2013.01); G08B 5/38 (2013.01); H04N 5/2357 (2013.01); H04N 5/335 (2013.01); H04N 5/3454 (2013.01); H04N 5/3456 (2013.01); H04N 5/357 (2013.01)

(58) Field of Classification Search
None
See application file for complete search history.

(56) References Cited

U.S. PATENT DOCUMENTS

| 7,728,269 B2 | 6/2010 | Lichtsteiner et al. |
| 2015/0195487 A1* | 7/2015 | Liu .............. H04N 5/21 348/447 |
| 2018/0032150 A1* | 2/2018 | Lee ............ H04N 5/2357 |
| 2020/0372254 A1* | 11/2020 | Laveau ............ H04N 5/3456 |
| 2021/0044744 A1* | 2/2021 | Sironi ............. H04N 5/23227 |
| 2021/0067679 A1* | 3/2021 | Tornes ............. H04N 5/2351 |

FOREIGN PATENT DOCUMENTS

WO  WO-2021180813 A1 * 9/2021

OTHER PUBLICATIONS

Censi, Andrea et al., "Low-Latency Localization By Active LED Markers Tracking Using a Dynamic Vision Sensor", Published in Intelligent Robots and Systems (IROS), 2013 IEEE/RSJ International Conference on Nov. 3-7, 2013.

* cited by examiner

Primary Examiner — Twyler L Haskins
Assistant Examiner — Wesley J Chiu
(74) Attorney, Agent, or Firm — F. Chau & Associates, LLC

(57) ABSTRACT

An event-based sensor includes a photoarray and a processing circuit. The photoarray includes an array of cells. Each cell includes a photosensor generating a sensor signal dependent on an intensity of light casted on the cell, and an intensity monitoring circuit outputting an ON signal when the light intensity is increasing and an OFF signal when the light intensity is decreasing. The processing circuit is configured to generate an event in response to the ON and OFF signals, filter out the events caused by flickering light, and pass the events caused by motion.

19 Claims, 11 Drawing Sheets

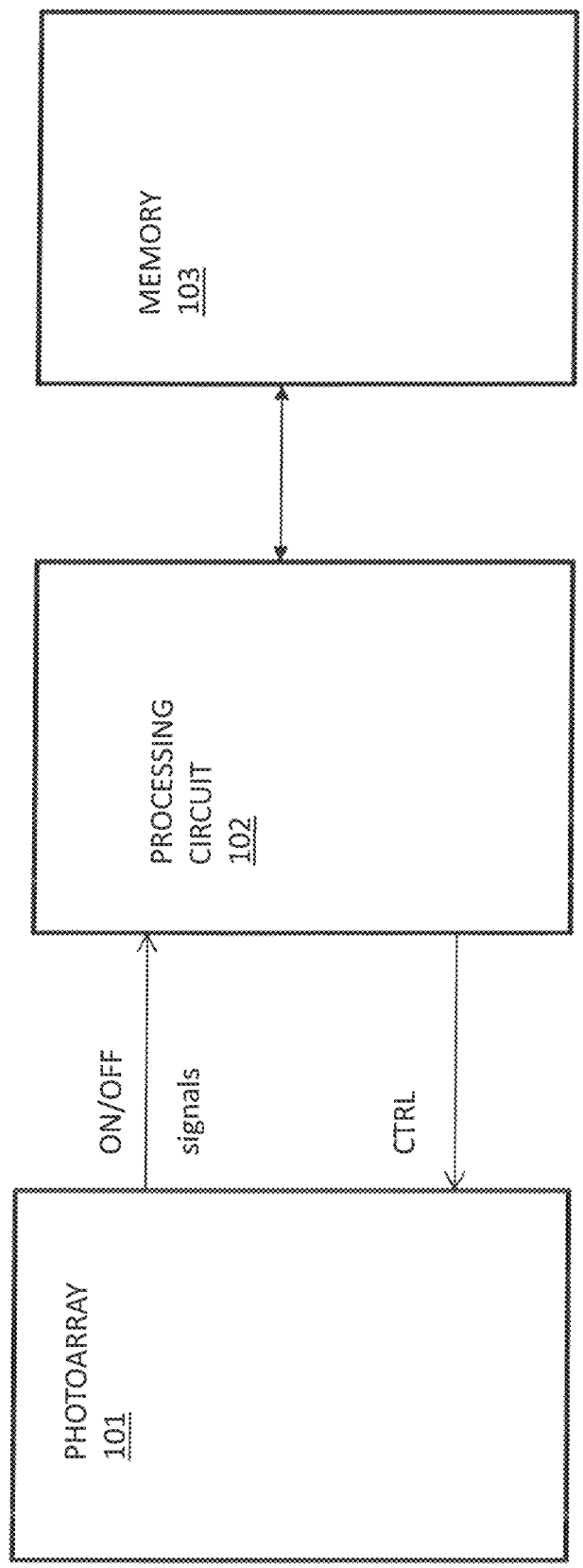

EVENT-BASED SENSOR THAT FILTERS FOR FLICKER

BACKGROUND

1. Technical Field

Exemplary embodiments of the present inventive concept relate to event-based sensors.

2. Discussion of Related Art

Event-based sensors output a stream of pixel-level brightness changes, termed events. Typically, events are generated from movement in a scene. However, when exposed to flickering light, an event-based sensor generates a lot of unwanted events, due to changes in the intensity of the flickering light. This phenomenon imposes a very high load on subsequent processing of the event data stream and may prevent the sensor from being used for real-time applications.

SUMMARY

According to an exemplary embodiment of the inventive concept, event-based sensor includes a photoarray and a processing circuit. The photoarray includes an array of cells. Each cell includes a photosensor generating a sensor signal dependent on intensity of light casted on the cell, and an intensity monitoring circuit outputting an ON signal when the light intensity is increasing and an OFF signal when the light intensity is decreasing. The processing circuit is configured to generate an event in response to the ON and OFF signals, filter out the events caused by flickering light, and pass the events caused by motion. The polarity of the event is determined by the type of the signal (i.e., ON or OFF).

According to an exemplary embodiment of the inventive concept, a method of controlling an event-based sensor to filter out events caused by flickering light is provided. The events indicate whether a cell of a photoarray of the event-based sensor receives light of an increasing or decreasing intensity. The method includes comparing a current event among the events and a previous event among the events to determine whether a polarity change is occurring (e.g., from ON to OFF or from OFF to ON); computing a time difference between the current event and prior event among the events when the polarity change occurs and the prior event has the same polarity change; determining a flicker probability using the time difference; and filtering out the current event when the flicker probability is above a threshold probability.

According to an exemplary embodiment of the inventive concept, a method of controlling an event-based sensor is provided. The event-based sensor includes a photoarray that outputs signals for each cell of the photoarray indicating whether light is increasing or decreasing in intensity. The method includes: generating polarity events from each of the signals; selecting one of the polarity events having a polarity change; calculating a time difference from the selected polarity event and a subsequent one of the polarity events having the same polarity change; determining a flicker probability based on the time difference; and filtering out the selected polarity event if the flicker probability is above a threshold probability.

At least one goal of the inventive concept is to pass events generated from motion in a scene and to filter out events caused by flickering light.

BRIEF DESCRIPTION OF THE DRAWINGS

The present inventive concept will become more apparent by describing in detail exemplary embodiments thereof with reference to the attached drawings, in which:

FIG. 1A illustrates an event-based sensor according to an exemplary embodiment of the inventive concept;

DETAILED DESCRIPTION

Figure 1B:
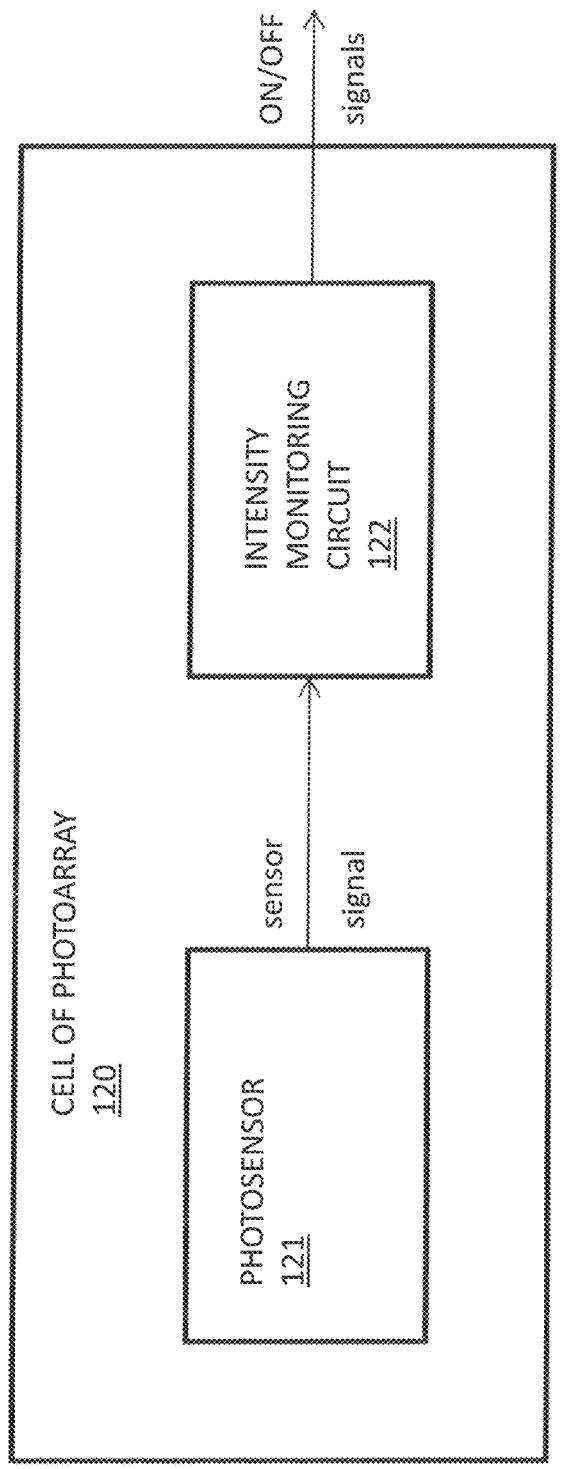
FIG. 1B illustrates a cell of a photoarray of the event-based sensor according to an exemplary embodiment of the inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

At least one embodiment of the inventive concept provides an event-based sensor capable of capturing events triggered by changes in the intensity of light, filtering out the events caused by flickering light, and retaining the events caused by motion of an object or an individual or the sensor. Thus, a process that later operates on the remaining events to detect a moving object can operate more efficiently and more quickly since it is operating on fewer events. Thus, a computer executing the process uses less computation resources (e.g., fewer CPUs, fewer cores, less memory) than a conventional object detection algorithm which is required to operate on all the events. Accordingly, operation of the computer can be greatly improved.

FIG. 1A illustrates an event-based sensor according to an exemplary embodiment of the inventive concept. The event-based sensor includes a photoarray 101, a processing circuit 102 (e.g., a digital signal processor), and a memory 103.

In an embodiment, the photoarray 101 includes a plurality of cells arranged in rows and columns, where each cell can be referred to as a pixel.

FIG. 1B illustrates a cell 120 among the cells according to an exemplary embodiment of the inventive concept. The cell 120 includes a photosensor 121 (e.g., a photodiode) generating a photocurrent (sensor signal) proportional to an amount (e.g., an intensity) of incoming light applied to the cell 120. The cell 120 further intensity monitoring circuit 122 that monitors the sensor signal to determine whether the intensity of the light is increasing or decreasing, outputs an ON signal when the intensity is increasing, and outputs an OFF signal when the intensity is decreasing.

In an embodiment, the monitoring circuit includes a capacitor, at least one threshold detector, and a discharge device. The capacitor may be charged with current proportional to the time derivative of the sensor signal. The threshold detectors may detect if the voltage over the capacitor exceeds a threshold value, and generate an output signal if the voltage does exceed the threshold value. The discharge device may be used for discharging the capacitor after occurrence of the output signals. In other words, charging (or discharging) the capacitor to a given charge (defined by the threshold value) generates an event in the form of the output signal. In an embodiment, data communication out of the photoarray 101 only occurs when the incoming light intensity changes.

Figure 2:
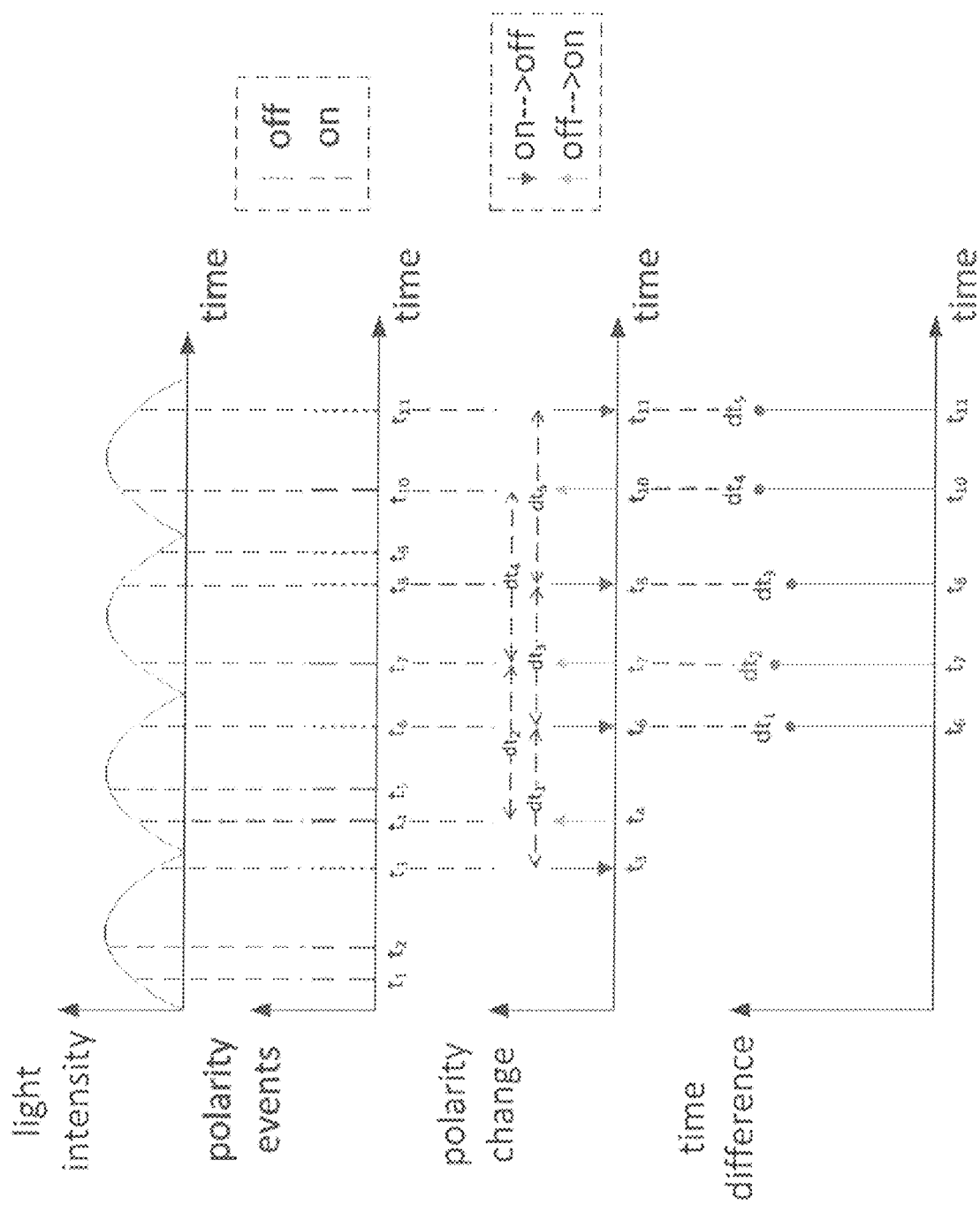
FIG. 2 illustrates an example of light being applied to the cell, and events and time differences that can be generated from the light according to embodiments of the inventive concept.

Thus, the photoarray 101 can output one ON/OFF signal for each cell to the processing circuit 102. For example, the first part of FIG. 2 shows an example where the intensity of the light applied to a given cell is periodically increasing and decreasing over time.

The processing circuit 102 filters out the ON/OFF signals that are caused by flickering light and retains those caused by motion. Light generated by a light bulb powered by an AC power grid (e.g., 50 Hz, 60 Hz) generates flickering light that may be incorrectly interpreted as being caused by motion of an object or an individual or the sensor. Thus, the processing circuit 102 can discard the ON/OFF signals that are caused by flickering light, and use the remaining ON/OFF signals to more efficiently detect the presence of a moving object and its extent (e.g., width, length, dimensions). Since the processing circuit 102 is operating on less ON/OFF signals, it can perform the detection more quickly and more accurately. The ON/OFF signals can be used to reconstruct an input signal at the cells. A reconstructed input signal can be calculated for a given cell of the photoarray 101 by adding a given intensity at each ON signal and subtracting the same intensity at each OFF signal. For example, if a cell is initially assigned a predefined light intensity, and then an ON signal is output for the cell, the given intensity is added to the predefined light intensity to generate a resulting light intensity. If an OFF signal had instead been output for the cell, the given intensity would have been subtracted from the predefined light intensity to generate the resulting light intensity.

The processing circuit 102 may output one or more control signals CTRL to the photoarray 101 to cause output of the ON/OFF signals. Each cell of the photoarray 101 may be connected to a distinct column line and row line that are addressed using one of the control signals CTRL. For example, the processing circuit 102 can apply a row signal of a control signal CTRL to a row line connected to a cell and a column signal of a control signal CTRL to a column line connected to the same cell to cause the cell to continuously output one of an ON signal and an OFF signal over a period of time.

In an exemplary embodiment, the processing circuit 102 performs a method that generates probability distribution functions from the ON/OFF signals generated from configuration scenes captured by the event-based sensor, and filters out ON/OFF signals generated from a new scene captured by the event-based sensor that are caused by flickering light instead of motion. The method may be implemented as a program stored in memory 103 and executable by a processor of the processing circuit 102. In an alternate embodiment, the steps of the method are implemented using logic circuits of the processing circuit 102.

Figure 3:
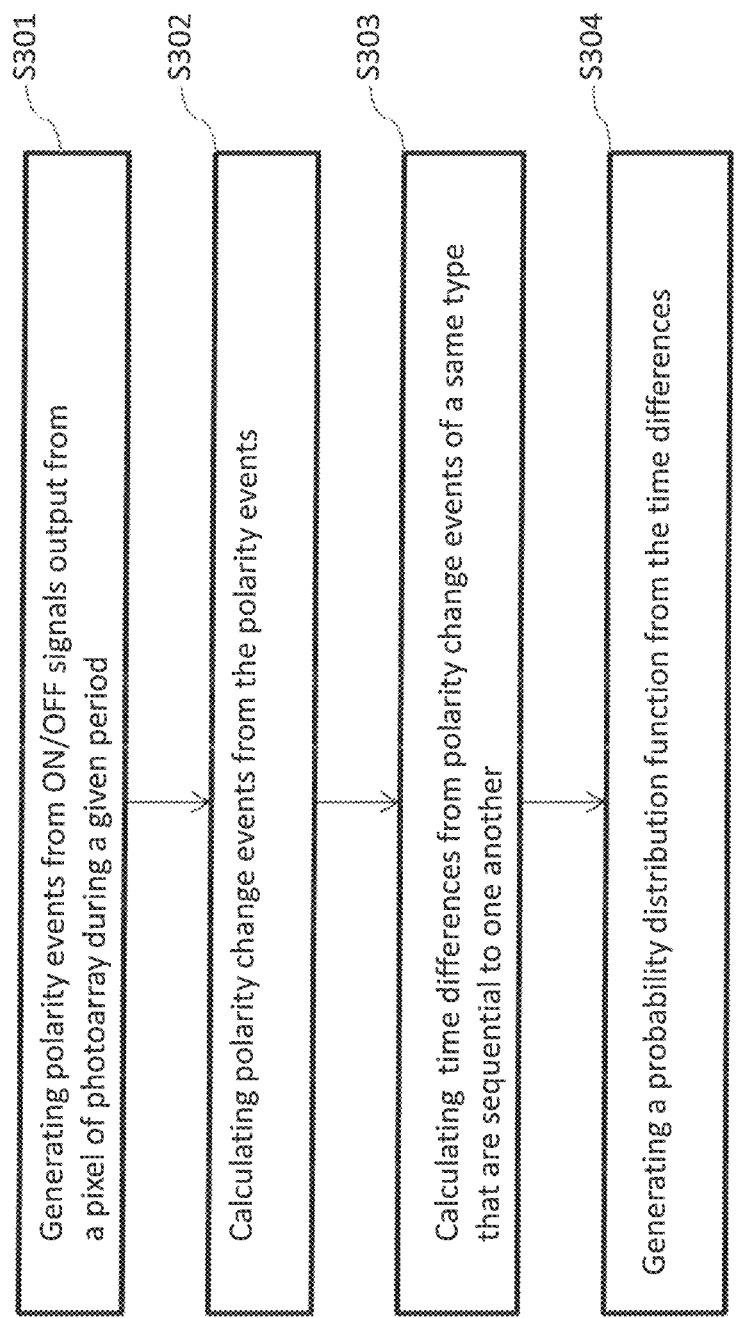
FIG. 3 illustrates a method of generating a probability distribution function (PDF) to be used in embodiments of the inventive concept.

FIG. 3 illustrates a method of generating a probability distribution function from the ON/OFF signals generated by the photoarray 101 according to an exemplary embodiment of the inventive concept.

Referring to FIG. 3, the method includes generating polarity events from the ON/OFF signals output from a cell (e.g., 120) of a photoarray (e.g., 101) during a given period (S301).

The processing circuit 102 can generate a polarity ON event for each ON signal received. The polarity ON event may include the coordinates of the corresponding cell and the time at which the corresponding ON signal was received. Further, the polarity ON event indicates that light intensity is increasing. For example, the second part of FIG. 2 shows that polarity ON events for a given cell was received at times $t_1$, $t_2$, $t_4$, $t_5$, $t_7$, and $t_{10}$.

The processing circuit 102 generates a polarity OFF event for each OFF signal received. The polarity OFF event may include the coordinates of the corresponding cell and the time at which the corresponding OFF signal was received. Further, the polarity OFF event indicates that light intensity is decreasing. For example, the second part of FIG. 2 shows that polarity OFF events for a given cell was received at times $t_3$, $t_6$, $t_8$, $t_9$, and $t_{11}$.

The method of FIG. 3 further includes calculating polarity change events from the polarity events (S302). A polarity change event can be a polarity on→off change event or a polarity off→on event. A polarity on→off change event indicates that a polarity ON event occurred followed by a polarity OFF event (light intensity increased and then decreased). A polarity off→on change event indicates that a polarity OFF event occurred followed by a polarity ON event (e.g., light intensity decreased and then increased). The third part of FIG. 2 shows that polarity on→off change events occurred at times t3, t6, t8, and t11. The polarity on→off change event at t3 is determined from the polarity ON event that occurred at time $t_2$ and the polarity OFF event that occurred at time t3, the polarity on→off change event at $t_6$ is determined from the polarity ON event that occurred at time $t_5$ and the polarity OFF event that occurred at time $t_6$, etc. The third part of FIG. 2 shows that polarity off→on change events occurred at times $t_4$, $t_7$, and $t_{10}$. The polarity off→on change event at $t_4$ is determined from the polarity OFF event that occurred at time $t_3$ and the polarity ON event that occurred at time $t_4$, the polarity off→on change event at $t_7$ is determined from the polarity OFF event that occurred at time $t_6$ and the polarity ON event that occurred at time $t_7$, etc.

In an embodiment, a polarity change event includes a time at which the event occurred which is the later of the times at which its constituent events occurred. For example, the polarity on→off event at time $t_3$ includes time $t_3$ because it is derived from the later of the polarity ON event that occurred at time $t_2$ and the polarity OFF event that occurred at time $t_3$.

The method of FIG. 3 further includes determining time differences (TD) from the polarity change events of the same type that are sequential to one another (S303). A time difference between two sequential polarity change events of a same type includes a time difference between two sequential polarity on→off change events or a time difference between two sequential polarity off→on change events. Part three and part four of FIG. 2 show examples of the time differences (dt). For example, a first time difference $dt_1$ is calculated from a time difference between an on→off change event at $t_3$ and an on→off change event at time $t_6$, a second time difference $dt_2$ is calculated from a time difference between an off→on change event at time $t_4$ and an off→on change event at $t_7$, a third time difference $dt_3$ is calculated from a time difference between an on→off change event at $t_6$ and an on→off change event at $t_8$, etc. The fourth part of FIG. 2 shows a comparison of the lengths of the time differences.

The method of FIG. 3 further includes generating a probability distribution function from the time differences (S304). For example, when the probability distribution function is depicted as a graph, the x-axis represents the time differences and the y-axis represents the probability of a given time difference being present.

Figure 4:
FIG. 4 illustrates a method of filtering out events caused by flickering light that are generated by the event-based sensor according to an exemplary embodiment of the inventive concept.

FIG. 4 illustrates a method of filtering out ON/OFF signals attributed to flickering light, according to an exemplary embodiment of the invention. The method includes determining a first probability distribution function of a scene with flicker and without motion (S401). For example, the event-based sensor of FIG. 1, upon being powered up, may request that a user apply the event-based sensor to a scene that includes flickering light and does not include moving objects. For example, the event-based sensor may include a display that presents an instruction informing the user to configure it by turning on at least one light powered by an AC power grid that casts light onto the scene and then apply the event-based sensor to capture light intensities of the scene while no objects are moving in the scene. The event-based sensor can then apply the method of FIG. 3 to the ON/OFF signals generated as a result of the capture to calculate the first probability distribution function.

Figure 5:
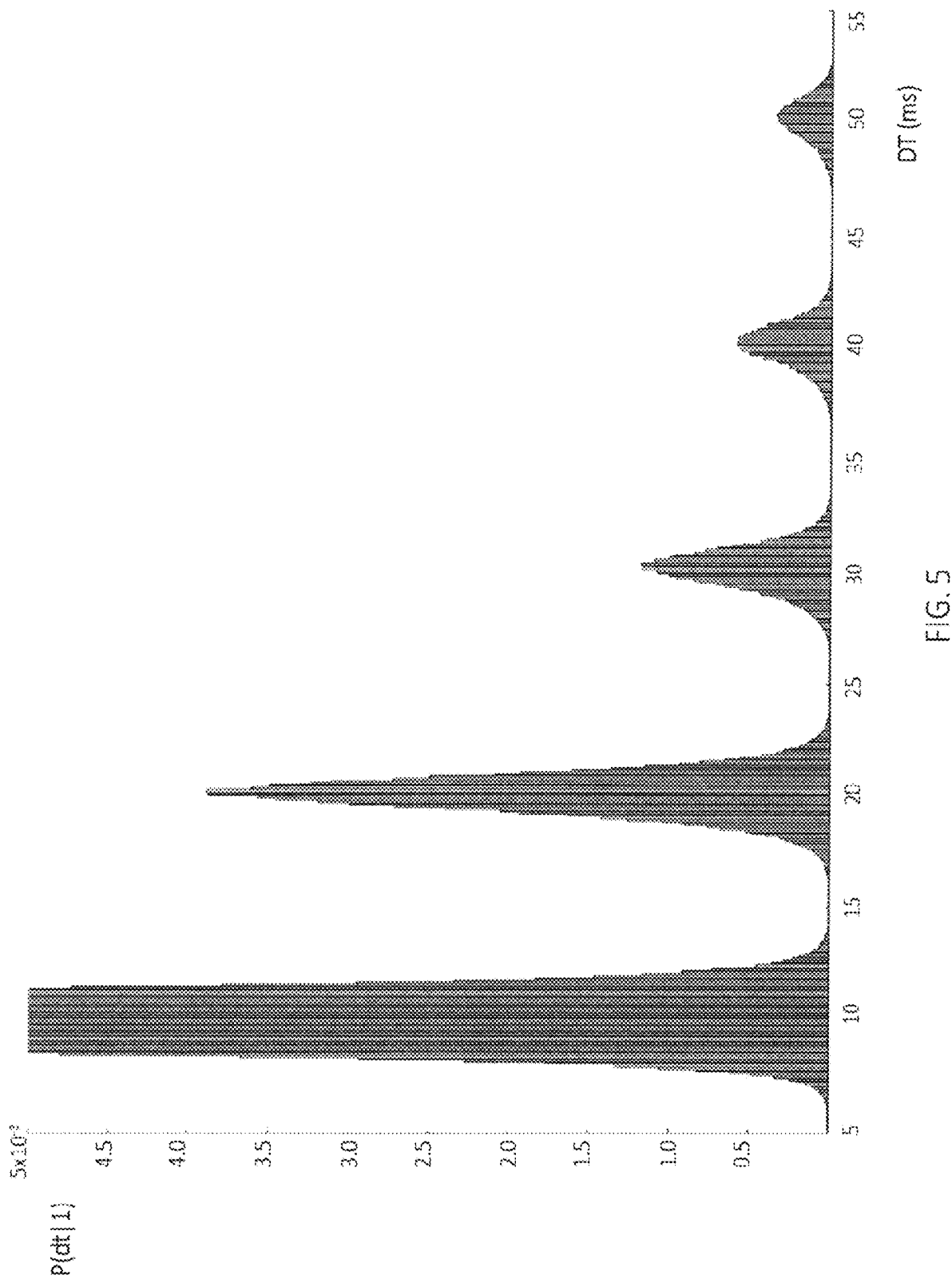
FIG. 5 illustrates an exemplary PDF generated from a scene including flicker only events that may be used in embodiments of the inventive concept to filter out the events caused by flickering light.

FIG. 5 illustrates an example of a first probability distribution function that may be generated using step S401 as a result of casting one or more lights powered by a 50 Hz power grid onto a scene and using the event-based sensor to capture light intensities of the scene without the presence of moving objects. However, the inventive concept is not limited to a power grid of any particular frequency, as 50 Hz is merely used as an example. For example, a 60 Hz power grid could be used instead of the 50 Hz power grid. As shown in FIG. 5, the intensity of flickering light has a repetitive pattern, with a time period of 1/(2*50)=10 ms. In this flickering scene, most of the TD measurements are concentrated around 10 ms. Occasionally, ON/OFF signals are dropped by the photoarray 101. Thus, there are also TD measurements in multiples of 10 ms such as 20 ms, 30 ms, etc. In addition, jitter may be present in the timing of the ON/OFF signals, which causes spreads in the TD measurement.

The method further includes determining a second probability distribution function of the scene without flicker and with motion (S402). For example, after the event-based sensor of FIG. 1 generates the first probability distribution function from the previous scene, it may request that the user apply the event-based sensor to the scene to capture light intensities of the scene without flickering light and including moving objects. For example, the display of the event-based sensor may next present an instruction informing the user to turn off all lights powered by the AC power grid that cast light onto the scene and then use the event-based sensor to capture light intensities of the scene while objects are moving in the scene (e.g., while a subject is walking through the scene). The event-based sensor can then apply the method of FIG. 3 to the ON/OFF signals generated as a result of the second capture to calculate the second probability distribution function.

Figure 6:
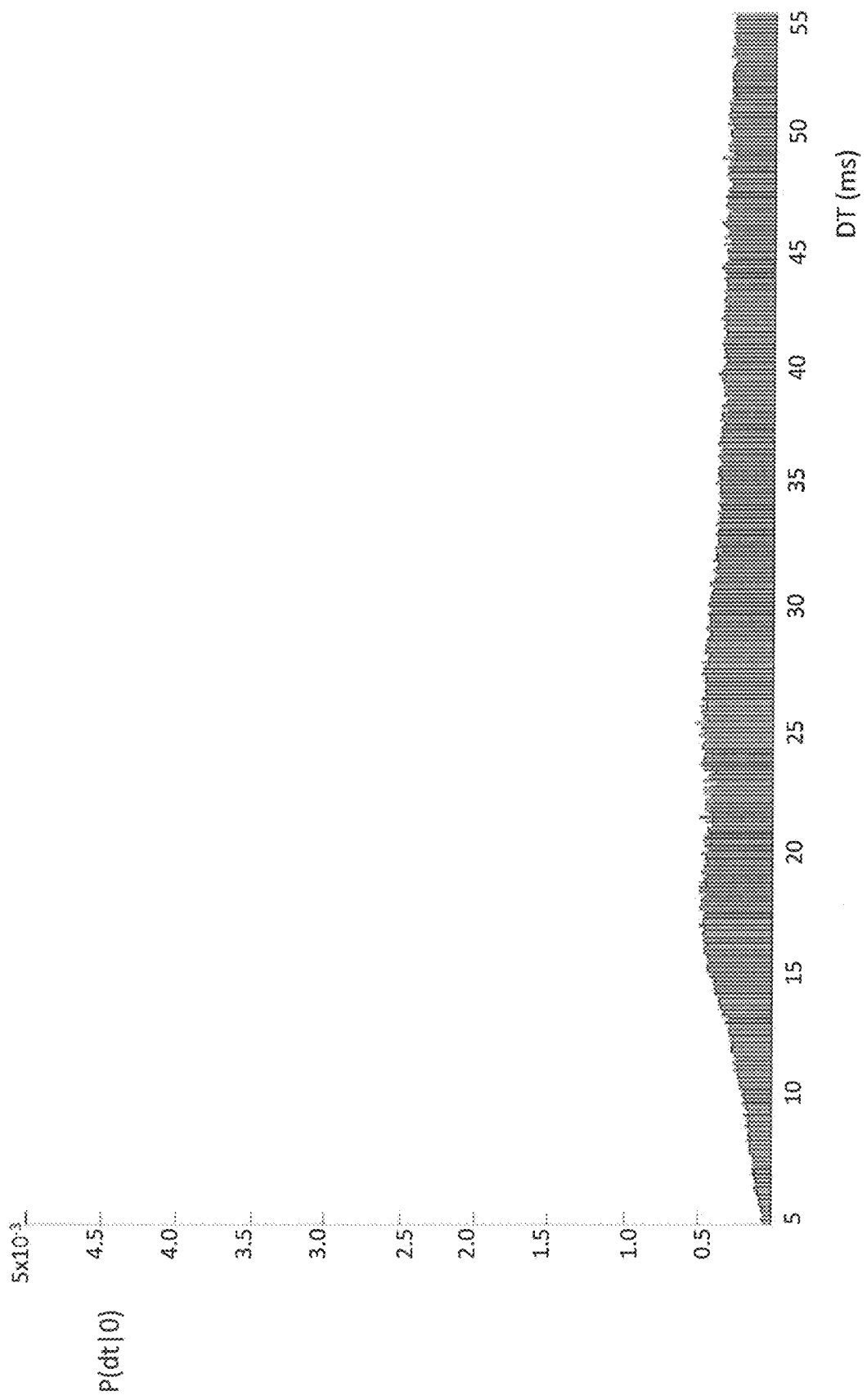
FIG. 6 illustrates an exemplary PDF generated from a scene excluding flicker events that may be used in embodiments of the inventive concept to filter out the events caused by flickering light.

FIG. 6 illustrates an example of a second probability distribution function that may be generated using step S402 as a result of turning off all the lights powered by the AC power grid that would otherwise cast light onto the scene and using the event-based sensor to capture light intensities of the scene with the presence of moving objects. For example, a user can use the event-based sensor to capture light intensities while a person is walking through the scene and the flickering lights are turned off (natural light may still be present). For this non-flickering scene, the polarity changes should depend on movements in the scene. These movements are typically non-repetitive. Thus, the time difference measurement has an approximately uniform distribution in FIG. 6.

The difference between the distributions of the time difference measure in FIG. 5 and FIG. 6 makes it a good candidate for separating flicker generated from movement generated events.

Figure 7:
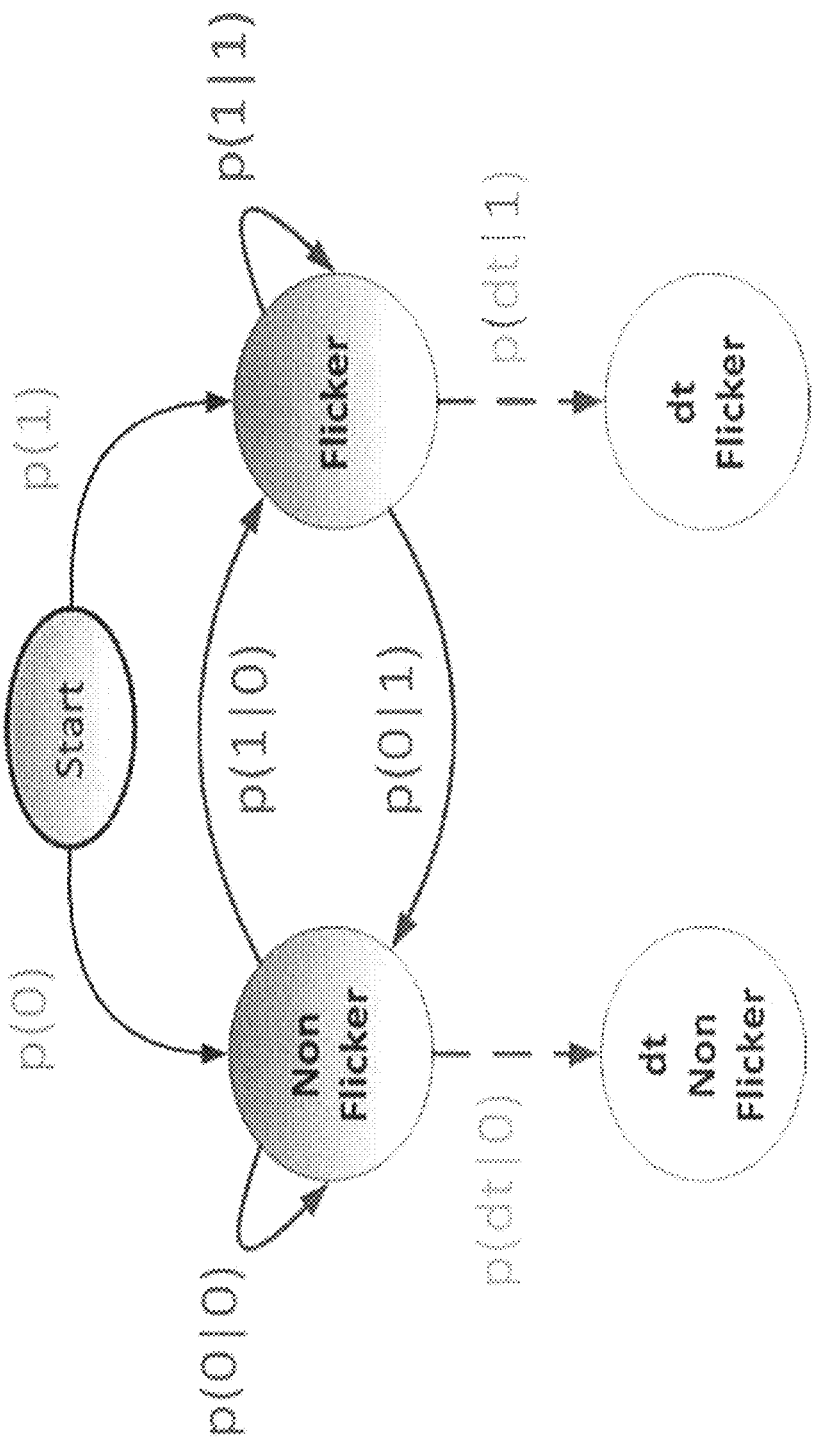
FIG. 7 illustrates a state diagram of flicker states of a cell of the photoarray.

Each pixel of the photoarray 101 can have two states: flicker and non-flicker (see FIG. 7). The pixel's state is marked as $X_i$, where i is the sequence index of the time difference events of the pixel. $X_i$ can have the values {0,1}, corresponding to {non-flicker, flicker} states, respectively. A time different event occurs when a polarity change event is subsequent to a polarity change event of the same type. The time of the time difference event is determined according to the later of the polarity change events constituting a time difference event. For example, in the fourth part of FIG. 2, time difference events occur at times $t_6, t_7, t_8, t_{10},$ and $t_{11}$. For example, the time difference event at time $t_6$ is caused by an on→off polarity change event at time $t_3$ and an on→off polarity change event at $t_6$, the time difference event at time $t_7$ is caused by an off→on polarity change event at time $t_4$ and an off→on polarity change event at time $t_7$, etc.

Before time difference events are generated, there is a prior probability of being in either one of the states. This probability is marked as ($X_0$). In addition, there is a transition probability between states, depicted as ($X_i|X_{i-1}$).

Each state has a probability distribution function (PDF) for the time difference measurement, which is referred to as an emission probability. These PDFs are marked as (dt|$X_i$).

Figure 8:
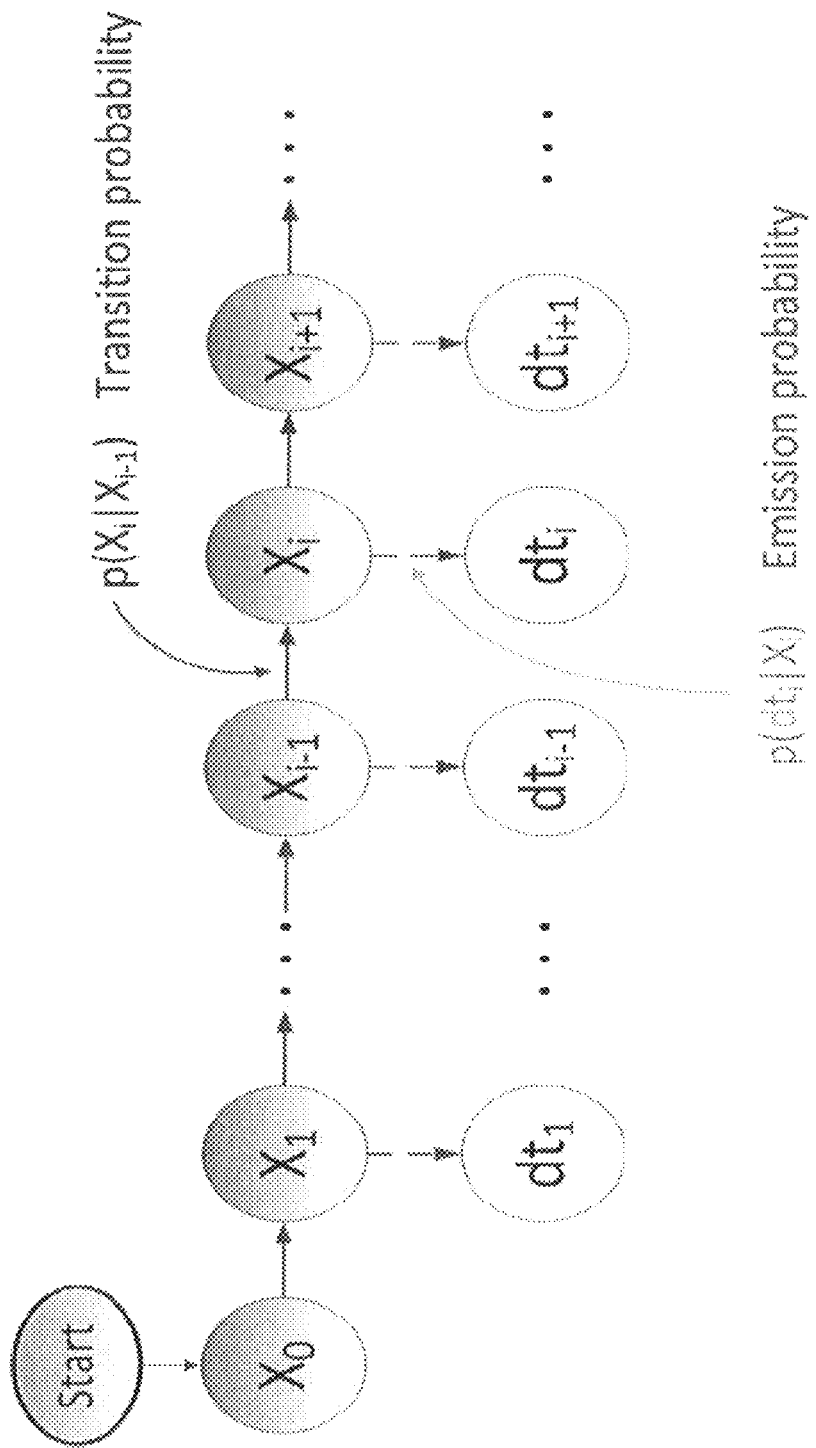
FIG. 8 illustrates a hidden markov model that may be used in embodiments of the inventive concept.

The flicker filtering problem can be modeled as a Hidden Markov Model (HMM) chain (see FIG. 8). The state of the cell 120 (pixel) is regarded as the hidden variable. The time difference measurement is the measurable variable. Our goal is to estimate the probability that the pixel is in flicker state.

With each time difference measurement, the flicker probability is updated. The flicker probability at the i'th step, given time difference measurements ($dt_1, dt_2, \ldots, dt_i$), is denoted as p($X_i|dt_{1:i}$).

The update of the flicker probability is done by the following steps:
1. Initialization:
    a. Initial flicker probability is set to the prior probability $p(X_0=1)$
    b. $(X_0=0)=1-(X_0=1)$.
2. Update:
    a. Given:
        i. Last step flicker probability $p(X_{i-1}=1|dt_{1:i-1})$.
        ii. $p(X_{i-1}=0|dt_{1:i-1})=1-p(X_{i-1}=1|dt_{1:i-1})$.
    b. Prediction step:
        i. $p(X_i=1|dt_{1:i-1})=p(X_i=1|X_{i-1}=0)\cdot p(X_{i-1}=0|dt_{1:i-1})+ P(X_i=1|X_{i-1}=1)\cdot p(X_{i-1}=1|dt_{1:i-1})$
        ii. $p(X_i=0|dt_{1:i-1})=1-p(X_i=1|dt_{1:i-1})$
    c. Bayesian update step:
        i.

$$p(X_i=1|dt_{1:i}) = \frac{p(dti|Xi=1)\cdot p(Xi=1|dt1:i-1)}{p(dti|Xi=0)\cdot p(Xi=0|dt1:i-1) + p(dti|Xi=1)\cdot p(Xi=1|dt1:i-1)}$$

ii. $p(X_i=0|dt_{1:i})=1-p(X_i=1|dt_{1:i})$

Polarity events corresponding to high flicker probability are filtered out. If a polarity event does not cause a polarity change, the last flicker probability is considered.

Once the event-based sensor has been configured as a result of performing the first two steps of FIG. 4, the remainder of the method of FIG. 4 can be used to filter out ON/OFF signals generated from a new scene.

Referring to FIG. 4, the method includes applying the event-based sensor to a new scene (S403). While the new scene typically includes moving objects and flickering light, the inventive concept is not limited thereto. For example, the new scene might not include flickering light or might not include moving objects.

The method further includes generating polarity events (e.g., polarity ON/OFF events) from ON/OFF signals output from a cell of a photoarray 101 of the event-based sensor (S404). For example, the polarity events generated at times $t_1$-$t_{11}$ in FIG. 2 are examples of the polarity events.

The method further includes advancing through the polarity events until finding a selected polarity event having a polarity change (S405). For example, the polarity event at time $t_3$ in FIG. 2 is an example of a polarity event having a polarity change since light intensity decreases at time $t_3$ after previously increasing at time $t_2$.

The method further includes calculating a time difference from the selected polarity event and a subsequent one of the polarity events having the same type of polarity change (S406). For example, time difference $dt_1$ in FIG. 2 is an example of the calculated time difference because it is the difference between the polarity event at time $t_3$ and the polarity event at time $t_6$ that reflects a decrease in light intensity after a previous increase in light intensity.

The method next includes determining a flicker probability based on the time difference, the first probability distribution function (PDF), and the second PDF (S407). The flicker probability may include a non-flicker state probability and a flicker state probability.

The method then includes filtering out the selected polarity event if the flicker probability is above a threshold probability (S408). For example, if the flicker probability is more than the threshold probability, then the selected polarity event (i.e., the corresponding increase or decrease in light intensity at a particular time) is likely to be caused by flickering light and not by motion. The method can resume to step S405 if there are more polarity events of the pixel to process. The method can resume to step S404 for a new pixel of the event-based sensor if there are no more polarity events of the current pixel to process.

The remaining polarity events may then be operated on by the processing circuit 102 to detect whether a moving object is present in the scene, the position of the moving object in the scene, and the dimensions of the moving object.

Figure 9:
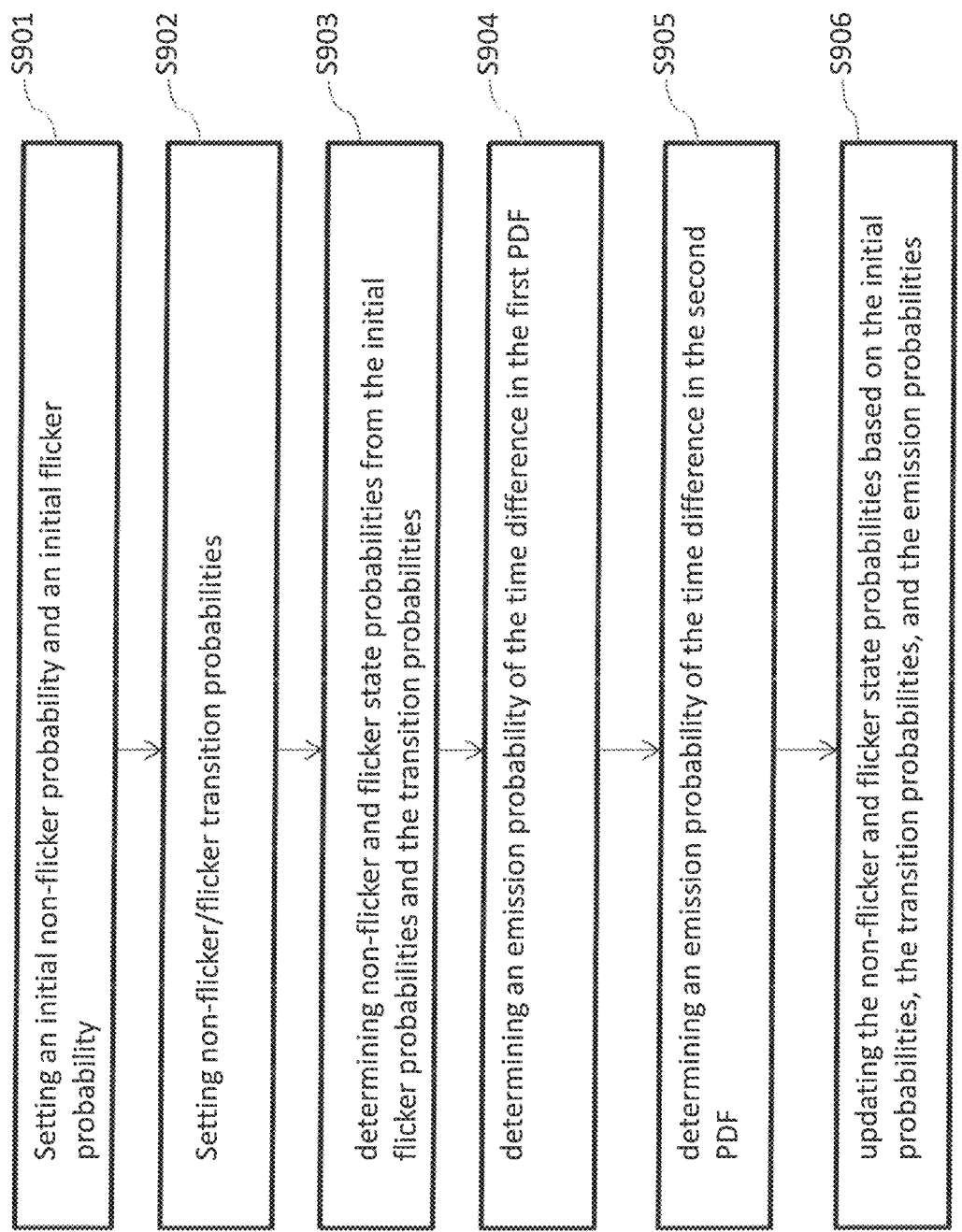
FIG. 9 illustrates a method for updating flicker probabilities used according to an exemplary embodiment of the inventive concept that may be used to filter out the events caused by flickering light.

The step S407 of determining the flicker probability may be accomplished by performing the method of FIG. 9 according to an exemplary embodiment of the inventive concept.

The method includes setting an initial non-flicker probability $p(X_0=0)$ and initial flicker probability $p(X_0=1)$ (S901). The initial non-flicker probability $p(X_0=0)$ is the initially assumed probability that a given light intensity change is not caused by flickering light (e.g., caused by motion of an object). The initial flicker probability is the initially assumed probability that a given light intensity change is caused by flickering light. In an exemplary embodiment, the initial non-flicker probability $p(X_0=0)$ and the initial flicker probability $p(X_0=1)$ may both be set to 0.5.

The method further includes setting non-flicker/flicker transition probabilities (S902). In an embodiment, the non-flicker/flicker transition probabilities include a non-flicker state→non-flicker state probability $p(X_i=0|X_{i-1}=0)$ (e.g., the probability of maintaining the non-flicker state), a non-flicker state→flicker state probability $p(X_i=1|X_{i-1}=0)$ (e.g., the probability of transitioning from a non-flicker state to a flicker state), a flicker state→non-flicker state probability $p(X_i=0|X_{i-1}=1)$ (the probability of transitioning from the flicker state to a non-flicker state), and a flicker→flicker state probability $p(X_i=1|X_{i-1}=1)$ (e.g., the probability of maintaining the flicker state).

The method includes determining a flicker state probability $p(X_i=1)$ and a non-flicker state probability $p(X_i=0)$ from the initial flicker probabilities and the transition probabilities (S903). For example, if the initial non-flicker probability $p(X_0=0)=0.5$, the initial flicker probability $p(X_0=1)=0.5$, the non-flicker→flicker state probability $p(X_i=1|X_{i-1}=0)=0.1$, and the flicker→flicker state probability $p(X_i=1|X_{i-1}=1)=0.95$, then the flicker probability $p(X_i=1)$ can be calculated by (non-flicker→flicker state probability*initial non-flicker state probability)+(flicker→flicker state probability*initial flicker state probability)=0.10*0.5+0.95*0.5=a flicker probability $p(X_i=1)$ of 0.525, which is according to the above Prediction step 2b. The non-flicker probability can then be calculated from subtracting the flicker probability of 0.525 from 1 for a non-flicker probability $p(X_i=0)$ of 0.475.

The method further includes determining an emission probability of the time difference in the first PDF (e.g., FIG. 5) representing the scene having flicker only events of the time difference (S904). For example, if the time difference $dt_1=10.44$ ms, then the first PDF emission probability $p(dt_i=10.44|X_i=1)$ along the y-axis in the first PDF could be 0.037 as an example.

The method further includes determining an emission probability of the time difference in the second PDF (e.g., see FIG. 6) representing the scene having motion events without flicker (S905). For example, if the time difference $dt_1=10.44$ ms, then the second PDF emission probability $p(dt_i=10.44|X_i=0)$ along the y-axis in the second PDF could be 0.00018 as an example.

The method further includes updating the non-flicker and flicker state probabilities based on the initial probabilities, the transition probabilities, and the emission probabilities (S906). For example, the updated flicker state probability may be calculated by (first PDF emission probability=0.037*previous flicker state probability=0.525)/((second PDF emission probability=0.00018*previous non-flicker state probability=0.475)+(first PDF emission probability=0.037*previous flicker state probability=0.525))= 0.9956, which is according to the above Bayesian update step 2c. Then, the updated non-flicker state probability can be calculated by subtracting the updated flicker state probability (0.9956) from 1 to arrive at an updated non-flicker state probability of 0.0044. Since the updated flicker state probability is so high, it is likely that the polarity event from which the time difference $dt_1$=10.44 ms was derived was caused by flickering light as opposed to motion, and can thus be filtered out.

For the next flicker probability calculation for a next time difference measure associated with the pixel, the updated flicker probabilities are used instead of the initial flicker probabilities, and so on.

Figure 10:
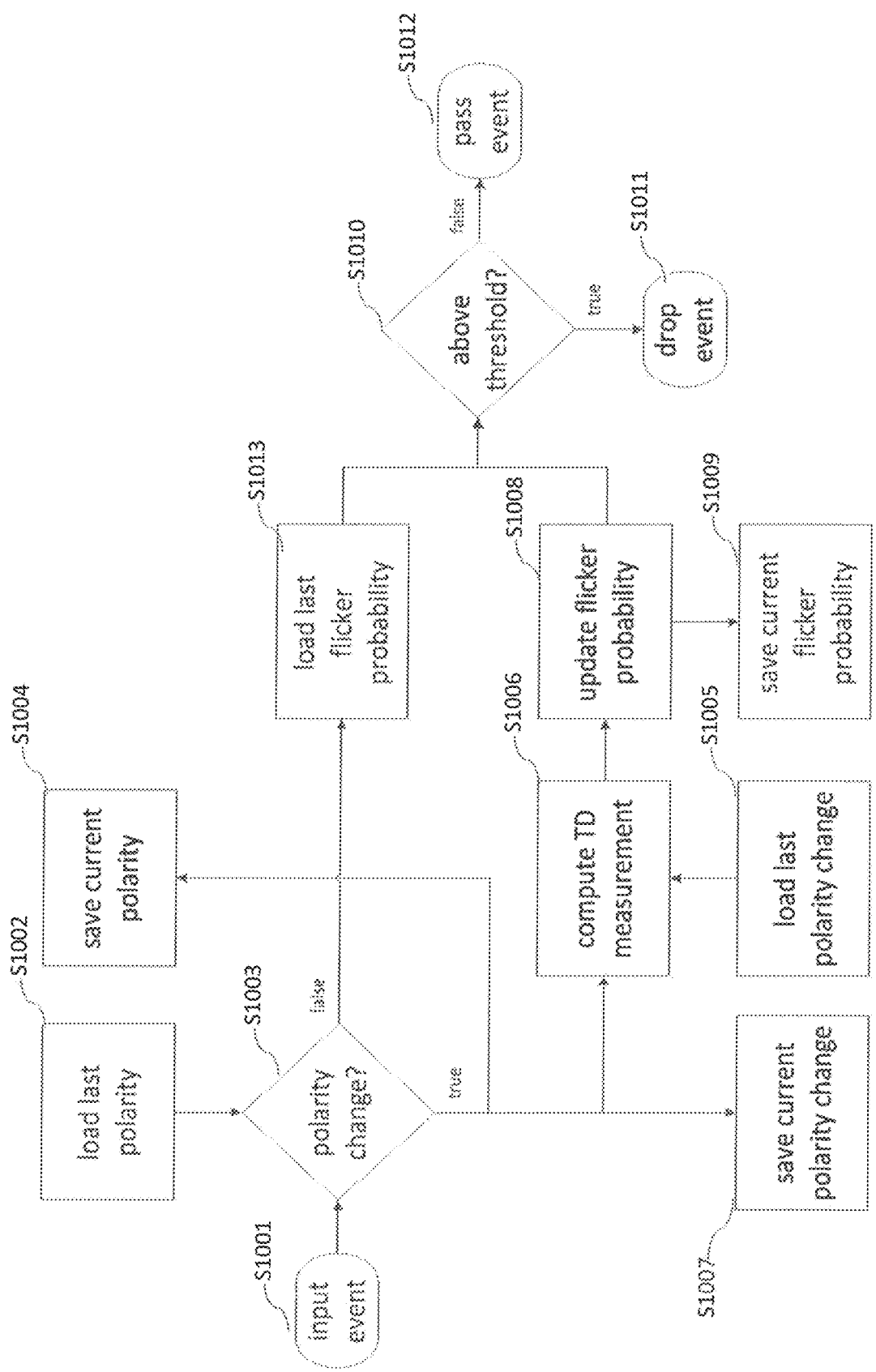
FIG. 10 illustrates a method of filtering out events caused by flicker according to an exemplary embodiment of the inventive concept.

FIG. 10 illustrates a method of filtering out events from an event-based sensor (e.g., a sensor that generates ON/OFF signals for each cell (pixel) of its photoarray indicating whether light cast on the cell is increasing or decreasing in intensity) according to an exemplary embodiment of the inventive concept.

The method includes inputting an event (S1001). For example, an ON or OFF signal output by the photoarray 101 of the event-based sensor is input to the processing circuit 102 through signal lines that identify the corresponding pixel, the processing circuit 102 determines the current time at which the signal is received, and generates an event from this information for input to a filtering circuit or filtering method of the processing circuit 102. The event indicates whether light cast on the cell is increasing or decreasing in intensity at the time.

The method further includes loading a last polarity for the pixel (S1002). For example, the last captured polarity of the pixel is loaded. For example, the last polarity could indicate that the intensity of light is increasing or decreasing.

The method further includes determining from the input event and the last polarity event whether a polarity change has occurred (S1003). For example, referring to FIG. 2, if the input event corresponds to the event at time $t_6$ corresponding to decreasing light intensity, then the last polarity would be the event at time $t_5$ having increasing intensity, and thus the processing circuit 102 would conclude that a polarity change has occurred (e.g., on→off).

If a polarity change has occurred, the method further includes saving the current polarity (S1004). In the above example, the system would save a polarity of a decreasing light intensity since the light applied to the pixel of the corresponding input event at time $t_6$ is decreasing in intensity. The save is performed so that the polarity change check of step S1003 can be performed on the next input event. In an embodiment, saved polarity is stored in memory 103.

If the polarity change has occurred, the method further includes loading the last polarity change time (S1005). For example, the last polarity change of a same type as the polarity change determined in step S1003 is loaded. For example, as shown in FIG. 2, since the current event at time $t_6$ has a polarity on→off change, then the last polarity change of a same type occurred at time $t_3$. Thus, time of the event that occurred at time $t_3$ is loaded. The time of the event may be loaded from memory 103.

The method further includes computing a time difference measurement from the event that experienced a polarity change and the loaded event time (S1006). In the above example, the time difference $dt_1$ between events at $t_3$ and $t_6$ would be calculated.

The method further includes saving the current polarity change (S1007). In the above example, the saved polarity change is that of increasing intensity followed by decreasing intensity (on→off) because light intensity is increasing at prior time $t_5$ and decreasing at current time $t_6$. The saved polarity change may indicate the type of polarity change (e.g., on→off or off→on) and the time when the polarity change occurred. In the above example, the time would $t_6$. The saved polarity change may be saved in memory 103.

The method further includes updating the flicker probability using the computed time difference measure (S1008). For example, as discussed above, the flicker probability can be updated using a previously calculated flicker probability for the pixel (or an initially set one), the emission probability P(dt|1) of the time difference measure from a PDF representing flicker only events without motion (e.g., see FIG. 5) and an emission probability P(dt|0) of the time difference measure from a PDF representing events without flicker and having motion.

The method further includes saving the current flicker probability (S1009). For example, the updated flicker probability for the pixel is saved and associated with the pixel so that it can be used as the previously calculated flicker probability for updating the flicker probability of the next ON/OFF polarity event at the same pixel.

The method further includes determining whether the updated flicker probability is above a threshold probability (S1010). If the updated flicker probability is 0.9956 as in the above example, and the threshold probability is 0.7 as an example, the updated flicker probability is above the threshold, and thus the current event would be dropped (S1011). However, if the time difference measure were 15 ms instead as an example, then its updated flicker probability would likely be less than the threshold probability, and thus the current event would have been passed (S1012). An event that is dropped is dropped because it is likely generated by flickering light as opposed to motion. An event that passed is passed because it is likely generated by motion of an object.

The method further includes loading the last flicker probability if it is determined that no polarity change has occurred (S1013). For example, as shown in FIG. 2, no polarity change occurs at time $t_9$ because the light intensity was also decreasing at prior time $t_8$. Thus, whatever flicker probability for the pixel that was calculated at time $t_8$ is also used for the event that occurred at time $t_9$. Thus, if the flicker probability at time $t_8$ resulted in the prior event being dropped, then the event at $t_9$ would also be dropped. Likewise, if the flicker probability at time $t_8$ resulted in the prior event being passed, then the event at $t_9$ would also be passed.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

When flickering light is present in a scene, it overloads the event data stream of an event-based sensor with unwanted events. This may prevent the sensor from being used even when a moderate amount of flickering light is present. Thus, embodiments of the invention prevent this overload by filtering out events generated by the flickering light and passing events originated by movement in the scene.

Although the present inventive concept has been described in connection with exemplary embodiments thereof, those skilled in the art will appreciate that various modifications can be made to these embodiments without substantially departing from the principles of the present inventive concept.

What is claimed is:

1. An event-based sensor comprising:
a photoarray comprising an array of cells, where each cell includes a photosensor generating a sensor signal dependent on an intensity of light casted on the cell, and an intensity monitoring circuit outputting an ON signal when the light intensity is increasing and an OFF signal when the light intensity is decreasing; and
a processing circuit configured to generate a plurality of events in response to the ON and OFF signals, select one of the events having a polarity change, calculate a time difference from the selected event and a subsequent one of the events having a same polarity change, determine a flicker probability based on the time difference, and filter out the selected event caused by flickering light when the flicker probability is above a threshold probability.

2. The event-based sensor of claim 1, wherein each of the events indicate a time when the corresponding event occurred, the cell from which the corresponding event originated, and whether the light intensity applied to the cell is increasing or decreasing.

3. The event-based sensor of claim 1, wherein the flickering light is caused by light generated from a light source powered by an alternating current (AC) power grid.

4. The event-based sensor of claim 1, wherein the processing circuit filters out a current event among the events for one of the cells using a first probability distribution function (PDF) of time differences generated based on a scene having the flickering light and a second PDF of time differences generated based on the scene excluding the flickering light.

5. The event-based sensor of claim 4, wherein the scene having the flickering light excludes moving objects and the scene excluding the flickering light includes at least one moving object.

6. The event-based sensor of claim 4, wherein the processing circuit determines the time difference between the current event and a prior event of the events for the one cell having the same polarity change, determines the flicker probability based additionally on the first PDF and the second PDF, and filters out the current event when the flicker probability is above the threshold probability.

7. The event-based sensor of claim 6, wherein the processing circuit determines the flicker probability from a previous flicker probability for the one cell, a previous non-flicker probability for the one cell, a first emission probability of the time difference in the first PDF, and a second emission probability of the time difference in the second PDF.

8. The event-based sensor of claim 7, wherein the flicker probability=(the first emission probability*the previous flicker probability)/((the second emission probability*the previous non-flicker probability)+(the first emission probability*the previous flicker probability)).

9. A method of controlling an event-based sensor to filter out events caused by flickering light, the events indicating whether a cell of a photoarray of the event-based sensor receives light of an increasing or decreasing intensity, the method comprising:

comparing, by a processing circuit, a current event among the events and a previous event among the events to determine whether a polarity change is occurring;
computing, by the processing circuit, a time difference between the current event and a prior event among the events when the polarity change occurs and the prior event has a same polarity change;
determining, by the processing circuit, a flicker probability using the time difference; and
filtering, by the processing circuit, out the current event when the flicker probability is above a threshold probability.

10. The method of claim 9, wherein the flickering light is caused by light generated from a light source powered by an alternating current (AC) power grid.

11. The method of claim 9, wherein the determining of the flicker probability is performed using a first probability distribution function (PDF) of time differences generated based on a scene having the flickering light and a second PDF of time differences generated based on a scene excluding the flickering light.

12. The method of claim 11, wherein the scene having the flickering light excludes moving objects and the scene excluding the flickering light includes at least one moving object.

13. The method of claim 11, the determining of the flicker probability comprises:
determining the time difference between the current event and the prior event of the events for the cell having the same polarity change; and
setting the flicker probability based on the time difference, the first PDF, and the second PDF.

14. The method of claim 13, wherein the setting the flicker probability comprises setting the flicker probability based on a probability of the cell transitioning from a flicker state to a non-flicker state, a probability of the cell transitioning from the non-flicker state to the flicker state, a probability of maintaining the flicker state, and a probability of maintaining the non-flicker state.

15. The method of claim 14, wherein setting the flicker probability comprises setting the flicker probability based on a previous flicker probability for the cell, a previous non-flicker probability for the cell, a first emission probability of the time difference in the first PDF, and a second emission probability of the time difference in the second PDF.

16. The method of claim 15, wherein the flicker probability=(the probability of the cell transitioning from the non-flicker state to the flicker state*the previous non-flicker probability for the cell)+(the probability of maintaining the flicker state*the previous flicker probability for the cell).

17. The method of claim 15, wherein the flicker probability=(the first emission probability*the previous flicker probability for the cell)/((the second emission probability*the previous non-flicker probability for the cell)+(the first emission probability*the previous flicker probability for the cell)).

18. A method of controlling an event-based sensor including a photoarray that outputs signals for each cell of the photoarray indicating whether light is increasing or decreasing in intensity, the method comprising:
generating, by a processing circuit of the event-based sensor, polarity events from each of the signals;
selecting, by the processing circuit, one of the polarity events having a polarity change;
calculating, by the processing circuit, a time difference from the selected polarity event and a subsequent one of the polarity events having a same polarity change;

determining, by the processing circuit, a flicker probability based on the time difference; and filtering, by the processing circuit, out the selected polarity event if the flicker probability is above a threshold probability.

19. The method of claim 18, wherein the determining of the flicker probability is based on the time difference, a first probability distribution function (PDF) of time differences generated from a scene including flickering light, and a second PDF of time differences generated from the scene excluding the flickering light.

* * * * *